H. L. DOHERTY.
PROCESS OF TREATING COMBUSTIBLE METALLURGICAL FURNACE GAS TO INCREASE ITS CALORIFIC VALUE.
APPLICATION FILED FEB. 17, 1910.
1,069,865.
Patented Aug. 12, 1913.
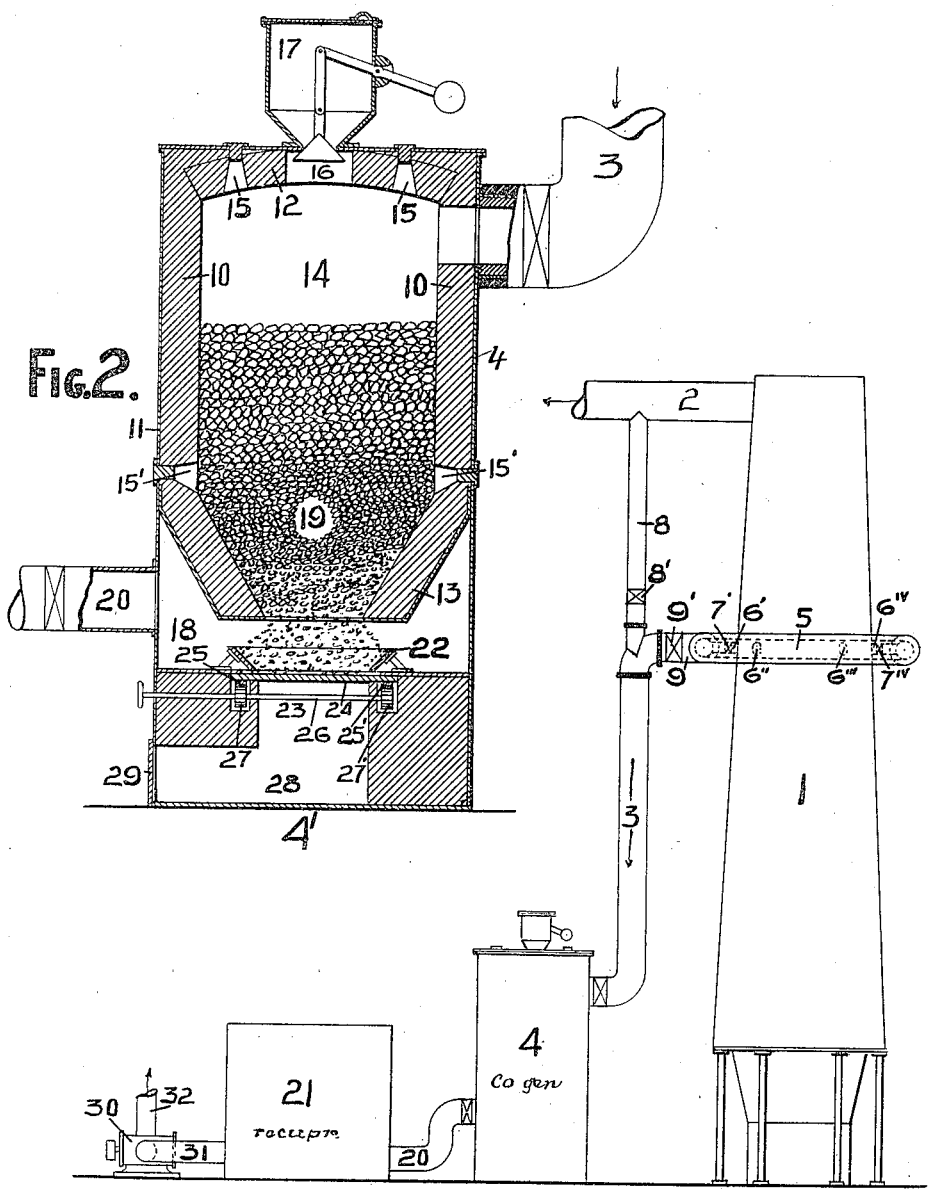

UNITED STATES PATENT OFFICE.

HENRY L. DOHERTY, OF NEW YORK, N. Y.

PROCESS OF TREATING COMBUSTIBLE METALLURGICAL-FURNACE GAS TO INCREASE ITS CALORIFIC VALUE.

1,069,865.  Specification of Letters Patent.  Patented Aug. 12, 1913.

Application filed February 17, 1910. Serial No. 544,485.

*To all whom it may concern:*

Be it known that I, HENRY L. DOHERTY, a citizen of the United States, and a resident of New York city, in the county of New York and State of New York, have invented certain new and useful Improvements in Processes of Treating Combustible Metallurgical-Furnace Gas to Increase Its Calorific Value, of which the following is a specification.

This invention relates to a process of treating combustible metallurgical-furnace gas to increase its calorific value and, in particular, to a process for accomplishing this end by reducing the carbon dioxid in said gas to carbon monoxid.

The object of my invention is the increasing of the calorific value of blast furnace gas, or other metallurgical furnace gas, by changing its carbon dioxid to carbon monoxid, at the expense of what is, otherwise, practically waste heat of the blast furnace.

Briefly, my invention consists in withdrawing a portion of the gas generated in the furnace, preferably, at a zone in the furnace such, that the cooling action to which the residual gases are subjected by contact with the raw materials of the charge in the upper portion of the furnace will be sufficient to reduce their temperature to approximate a selected degree set forth below, and contacting the portion of the furnace gases so withdrawn with incandescent carbon, together with various other features described in detail below. In the most advantageous form of my invention I pass the hot gases downward through the bed of fuel, whereby the hottest gases are contacted with the freshest fuel which contains the greatest proportion of combustible carbonaceous material, and where the reduction of $CO_2$ and $H_2O$ is the most rapid. As the gases pass downward through the fuel bed, they are cooled by the absorption of their sensible heat to support the reducing reactions. They are thus, as their temperature falls, brought into contact with fuel containing a regressively lower proportion of combustible and a progressively greater proportion of ash. As the tendency of the coked fuel and ash mixture to form clinker increases with the decrease in the ratio of combustible to ash, and the temperature of the gases decreases with the decrease in carbon in the fuel with which they are in contact, by regulating the temperature at which the gases are introduced into the upper part of the fuel body, it is obviously possible to establish, with fuels of normal composition, such a relation between the temperature of the gases and the composition of the fuel body with which they are in contact, that the formation of clinker may be reduced to a minimum or almost entirely avoided.

In the accompanying drawings, I have shown a form of apparatus for applying my invention.

Figure 1 is a diagrammatic elevation of my apparatus. Fig. 2 is a vertical section through the carbon dioxid reducer or carbon monoxid generator and superheater of the same.

In the several views, 1 is the blast furnace in which the gas is generated as a necessary by-product of the smelting operation in the furnace.

2 is the downcomer or gas conduit through which the gases are withdrawn from the furnace in normal operation.

3 is a conduit conducting to the carbon dioxid reducer or carbon monoxid generator 4, that portion of the furnace gas which I desire to treat for the reduction of $CO_2$.

5 is a bustle-pipe encircling 1 at a considerable distance below the top of the furnace. A plurality of connections, 6', 6'', etc., establish communication between the bustle-pipe 5 and the interior of the furnace 1. Dampers 7', 7'', etc., on the respective connections 6', 6'', etc., permit of the regulation of the volume of the hot gases withdrawn through the respective connections to secure a uniform withdrawal of gases around the periphery of the furnace shaft. 3 is connected, on the one hand, with the downcomer 2 by the connection 8, and on the other hand, with the bustle-pipe 5 by the connection 9. Valves or dampers 8' and 9', respectively, serve to regulate the relative proportion of furnace gases withdrawn from the respective off-takes 2 and 5 which go to the generator 4, or communication between 2 and 3 may be cut off entirely by valve 8'.

The generator 4, is built on the general lines of an ordinary gas producer, with only such changes as are necessary, or at least advisable, to adapt it to carry out my process.

10 is the refractory wall of generator 4.
11 is a metal shell incasing the walls 10.
12 is the thick arched top of generator 4, built of fireclay or other refractory material.
13 is the hopper bottom of the fuel chamber 14.
15, 15 are poke-holes in the arched top 12 of chamber 14, 15', 15' poke-holes in the wall 11 which provide means of access to the fuel chamber 14 for the purpose of working the fuel bed in 14.
16 is the fuel charging opening, 17 the fuel hopper.
18 is the gas-collecting chamber to which the gas passes on leaving the fuel bed 19 in chamber 14.
20 is the gas conduit conducting the enriched gas from the generator 4 to the gas recuperator or cooler 21.
22 is a hopper which receives the ash and unburned fuel discharged from the fuel bed 19 and guides it into the ash chute 23.

A horizontally-moving gate 24 provided with racks 25 and 25' is operated by the shaft 26 bearing the spur wheels 27 and 27'. On opening the gate 24, the ash drops into the ash pit 28 and, after closing gate 24, can be removed through the ash door 29.

The gas to be treated is admitted to the upper part of the fuel chamber 14, from the conduit 3.

The recuperator 21 may be of any type preferred. It is simply necessary that the construction be such that the gas will be cooled down to a temperature that will not injure the exhauster 30. Usually it comprises a number of flues through which the gas circulates and which are cooled by a current of air flowing in a direction opposite to that of the gas. The exhauster 30 may be of any type in common use, or which may be preferred. The conduit 31 connects the recuperator 21 with the exhauster 30. The discharge pipe 32 of exhauster 30, conducts the treated gas to any place of use desired.

The method of carrying out my invention in its most advantageous form is as follows:—The gas to be treated is drawn off of the furnace 1 through the connections 6', 6'', etc., and passes through the bustle-pipe 5 and conduit 3 to the generator of $CO_2$ reducer 4. The proportion of gas withdrawn through 6', etc., should be so regulated as not to interfere with the working of the furnace. The off-takes 6', etc., should be located at that zone of the furnace at which the gases will have during the coolest working that occurs in normal operation a temperature such that, after passing through the several conduits to the generator 4, they will enter the latter with sufficient sensible heat to sustain the reducing reaction which they undergo therein. All of the gas passages up to the generator 4 should have a heavy lining of fireclay, and be heavily insulated externally. The gas as it leaves the furnace will usually have a composition of, approximately, Carbon monoxid = 23% by volume,
Carbon dioxid = 12% ,, ,,
Hydrogen = 2% ,, ,,
Methane = 2% ,, ,,
Water vapor = 3% ,, ,,
Nitrogen = 58% ,, ,, Making proper allowance for the radiation loss in the producer, a gas of this composition should enter the fuel bed in the generator at a temperature of approximately 2500° Fah. in order to sustain the reducing reaction which takes place in the generator. As the gas passes downward through the fuel bed in the generator its $CO_2$ reacts with the carbon of the fuel bed according to the reaction, (a)    $CO_2 + C = 2CO$.

I thus not only secure the elimination of $CO_2$ from the gas but change it into double the volume of a combustible gas. Since I am not, in this case, using air to maintain the temperature of the fuel bed I am introducing no additional nitrogen into the gas. The increase in volume which I secure (equal to the original volume of the reducible $CO_2$) by thus changing the $CO_2$ to $CO$ thus reduces the proportion of nitrogen in an inverse ratio to one-half of the increase in relative volume of $CO$ present in the gas. The reduction in percentage of non-combustible, which I secure by my treatment of the furnace gas, is thus considerably greater than that due to the volume of $CO_2$ eliminated. A blast furnace gas of the composition given, after treatment under favorable conditions, would have a composition as follows:—

$CO$ = 38.4%
$CO_2$ = 2.7%
$H_2$ = 3.8%
$CH_4$ = 1.3%
$H_2O$ = 1.6%
$N_2$ = 52.2%

The calorific value (latent) of the untreated gas of the composition given would be 100 B. T. U. per cu. ft. (normal) while the treated gas would have a calorific value of 148 B. T. U. per cu. ft. (normal). At the same time, the volume of the treated gas has been increased by 11.5% of the volume of the untreated gas. In other words, the latent calorific value per cu. ft. of the untreated gas has been increased by my treatment to 165 B. T. U. per cu. ft. This is a very important point where the blast furnace gas is to be used for the production of high temperatures. The removal of the $CO_2$ and the diminution in the percentage of nitrogen, with the proportionate increase in the carbon monoxid, will permit of the attainment of much higher flame temperatures. Besides, by withdrawing a portion of the gas from the furnace gases at a point well down in the stack, I can practically equalize the thermal capacities of the descending charge of solid material and the ascending gas current passing in contact therewith, thus securing a better recuperation of the sensible heat of the gases discharging through the regular downcomer. If, for any reason, it is not desirable to withdraw the portion of the furnace gases that are to be passed through the generator, from the bustle-pipe 5, I then withdraw them from the main current of gases passing through the downcomer 2. In this case it is usually necessary to supply additional sensible heat to the gases prior to passing them through the fuel bed in the reducer according to the process of my Letters Patent 964,901, dated July 19, 1910.

The temperature of the furnace gases, at any given level in the furnace, necessarily varies more or less according to the conditions of running. As stated, I prefer to locate the gas off-takes 6', 6", etc., at that zone of the furnace at which the gases will have, during the coolest running, a sufficiently high temperature to sustain the generator reaction. In this case, during normal running, or abnormally hot running, the gases at the level of 6', 6", etc., will have a temperature in excess of that required. Therefore, instead of withdrawing all of the gas to be treated from 6 and 6' I draw the gas in part from 6', 6", etc., and in part from the top of the furnace through the conduits 2 and 8, the two streams uniting and flowing through the conduit 3 to the generator 4. By adjusting valves 8 and 9 and the speed of the exhauster it is obvious that any desired mixture of the two gases and therefore any desired temperature may be secured in the gases introduced into the generator, between the temperature prevailing in the furnace at the level of 6 and 6' and that prevailing in the downcomer 2. Usually, the proportion of the gases drawn from the downcomer will be relatively small, since I use only sufficient of the downcomer gases to balance any excess of temperature that may exist in the furnace gases at the level of the off-takes 6', 6", etc.

When the furnace gas, for any reason, contains an abnormal percentage of $CO_2$ and it is not practicable to withdraw the gas at the proper temperature, or to communicate to the gas in the manner described in the Letters Patent mentioned sufficient heat to insure the reduction of the $CO_2$ of the gas in its passage through the fuel bed, I have recourse to another method of heating the gas, which I prefer to employ as a purely auxiliary method to the one of heating by means of the combustion of a portion of the gas in the recuperator according to the said Letters Patent. In this auxiliary method, I pass into the upper part of the reducer above the fuel bed with the gas, a small proportion of air, preferably that which has been heated in the gas cooler or recuperator 21 by the finished gas discharging from the generator 4. This modification, however, is disclosed and claimed in my Letters Patent No. 1,008,450, dated Nov. 14th, 1911, and I therefore do not describe it in detail herein.

By my preferred method of introducing the superheated gas to be treated above the fuel bed in the producer, the temperature that I may give to the crude gas is limited only by the degree of refractoriness of the materials used for the lining of the superheater, conduits and generator. The higher the temperature of the gases, within practical working limits, the more energetic is the reduction. With high initial temperature therefore, the reduction is carried out, for the most part, in the upper strata of the fuel bed, and the gases, as they are cooled by the reactions, are brought into contact with a fuel body containing a lessening proportion of combustible and an increasing proportion of ash. By regulating the initial temperature, so that the temperature of the gases after the completion of the reactions shall not be above the clinkering temperature of the ash, it is thus possible to carry out the treatment of the gases without the formation of an objectionable amount of clinkers in the reducer. This method of operation thus permits the contacting of the hottest gases with that portion of the fuel containing the greatest proportion of combustible and then with fuel containing a regressively lessening proportion of combustible as the temperature of the gases diminishes. For this reason this method of operating the generator possesses decided advantages, although my process may be carried out in an ordinary up-draft producer of proper construction.

When the gas to be treated is introduced into the lower portion of a bed of fuel, in contact with the ash of the fuel, the temperature that may be given to the entering gas is limited by the sintering temperature of the ash, and also, where the fuel bed is supported upon an ordinary grate, by the temperature that the grate will stand. When the temperature to which the ash is exposed exceeds the sintering temperature, the result is that the ash is fused into an almost solid mass of clinker that may completely cut off the draft of the generator. When this occurs, it is of course necessary that the operations be suspended until the clinker formed has been removed. The necessity of such an operation introduces such troublesome irregularities in treatment and in the quality of the gas produced that such a method of operating is almost impracticable. By my method of introducing the superheated gas above the fuel bed in contact with the latest charged fuel I am able to enter the gas with sufficient contained heat to sustain the reactions in the generator and yet avoid any objectionable clinkering. The reason for this is that, in the first place, the fresh fuel (so long as it is non-caking) may be exposed to any temperature desired without the formation of clinkers in the ash zone so long as the high temperature of the fresh fuel is not permitted to extend down into the ash zone, or the zone in which the proportion of ash is considerable. The ash forming mineral in the fuel is, for the most part, disseminated throughout the fuel in small particles which are enveloped by the carbon, and are thus isolated from each other. In this condition the fuel can be heated so that the ash forming particles may be fused to a liquid, without the formation of any clinker, so long as the temperature of the mass is reduced sufficiently to again solidify the mineral particles before their carbonaceous envelops have been burned away. In my process, the reactions set up in the fuel bed automatically reduce the temperature both of the gas current and of the fuel of the bed before the lower layers thereof have been reached. Both the dissociating reactions, mentioned, viz., $$CO_2 + C = 2CO$$

and $$H_2O + C = H_2 + CO,$$

absorb large quantities of heat. Since I am to enter my crude gas at a temperature such that, after its $CO_2$ and $H_2O$ have been reduced, the resulting temperature of the gases and of the fuel bed in contact therewith, will have been reduced to a point below the softening point of the mineral matter of the coal, I secure the necessary reduction in temperature of the partially consumed fuel before the carbonaceous envelops of the ash-forming particles have been sufficiently burned away to permit of the particles coming into mutual contact.

When the flame temperature that may be developed by the untreated gas, is sufficiently high to permit of the main current of furnace gas being given the proper temperature to sustain the reaction in the generator I use the untreated gas for heating the superheater. When the untreated gas will not develop the required temperature I then divert part of the rich, treated gas back through the pipe 21 and connections to the superheater.

It is to be understood that my present invention may be applied advantageously to the treatment of gases from metallurgical furnaces generally which have a composition similar to that of blast furnace gas, viz., a larger content of oxygen (combined) in relation to the nitrogen present than exists in air.

Having described my invention, what I claim is:—

1. The process of treating a combustible furnace gas containing carbon dioxid, which consists in withdrawing the said gas from the furnace at a temperature such that the contained sensible heat of the gas will be sufficient to balance the heat required for the dissociation of the reducible proportion of its carbon dioxid and passing the said gas in contact with ignited fuel, the said gas being first contacted with relatively fresh fuel, whereby the reducible carbon dioxid of the gas is converted to carbon monoxid.

2. The process of treating a combustible furnace gas containing reducible quantities of carbon dioxid which consists in withdrawing the said gas from the furnace at a temperature such that the contained sensible heat of the gas will be sufficient to balance the heat required for the dissociation of the reducible proportion of its carbon dioxid and passing the said gas in contact with ignited fuel, the said gas being first contacted with that portion of the fuel containing the greatest proportion of combustible and then with fuel containing a regressively less proportion of combustible as the temperature of the said gas is diminished by the heat absorbed in the reduction of its contained carbon dioxid to carbon monoxid.

3. The process of treating a combustible furnace gas containing a reducible proportion of carbon dioxid which consists in withdrawing the said gas from the furnace at a temperature such that the contained sensible heat of the gas will be sufficient to balance the heat absorption in the reduction of its reducible carbon dioxid and passing the said gas through the fuel bed of a down-draft producer.

4. The process of treating a combustible metallurgical-furnace gas containing a reducible proportion of carbon-dioxid which consists in withdrawing the said gas from the furnace at a temperature as near the one at which the sensible heat of the gas will suffice to balance the heat required for the reduction of its reducible carbon dioxid, as is practicable, supplying any deficiency in the sensible heat of the gas below the quantity specified by burning a portion of said gas to heat the remainder, and passing the hot furnace gas in contact with incandescent carbonaceous fuel whereby the reducible carbon dioxid of said gas is reduced to carbon monoxid.

5. The process of treating a combustible metallurgical-furnace gas containing a reducible proportion of carbon dioxid which consists in withdrawing said gas from the furnace at a temperature as near to the one at which the sensible heat of the gas will suffice to balance the heat required for the reduction of its reducible carbon dioxid, as is practicable, supplying any deficiency in the sensible heat of the gas below the quantity specified by burning a portion of said gas to heat the remainder, and passing the hot furnace gas in contact with incandescent carbonaceous fuel, the said gas being first contacted with that portion of said fuel containing the greatest proportion of combustible and then with fuel containing a regressively less proportion of combustible as the temperature of the said gas is diminished by the heat absorbed in the reduction of its contained carbon dioxid to carbon monoxide.

6. The process of treating a combustible metallurgical furnace gas containing a reducible proportion of carbon dioxid to change said carbon dioxid to carbon monoxid which consists in withdrawing the said gas from the metallurgical furnace in which it is formed as near to the one at which the sensible heat of the gas will suffice to balance the heat required for the reduction of its reducible carbon dioxid as is practicable, supplying any deficiency in the sensible heat of the gas below the quantity specified, by burning a portion of said gas by air heated by heat taken from the treated gas, to heat the remainder of said gas, and passing the so-heated furnace gas in contact with incandescent carbonaceous fuel, the said gas being first contacted with that portion of said fuel which contains the greatest proportion of combustible and then with fuel containing a regressively lessening proportion of combustible as the temperature of the said gas is diminished by the heat absorbed in the reduction of its contained carbon dioxid to carbon monoxid.

7. The process of treating a combustible metallurgical-furnace gas containing a reducible proportion of carbon dioxid to change said carbon dioxid to carbon monoxid, which consists in withdrawing the said furnace gas from the furnace at a temperature as near to the one at which the sensible heat of the gas will suffice to counterbalance the heat required for the deduction of its reducible carbon dioxid, as is practicable, supplying any deficiency in the sensible heat of the gas below the quantity above specified by burning a portion of the said furnace gas by air which has been preheated by heat taken from a portion of treated gas, in proximity to a bed of ignited carbonaceous fuel and passing the gas mixture resulting from the partial combustion of said gas through said bed of ignited carbonaceous fuel, whereby the reducible carbon dioxid of such gas mixture is reduced to carbon monoxid.

8. The process of treating a combustible metallurgical-furnace gas containing a reducible proportion of carbon dioxid to change said carbon dioxid to carbon monoxid which consists in withdrawing the said furnace gas from the furnace at a temperature as near to the temperature at which the sensible heat of the gas will suffice to counterbalance the heat required for the reduction of its reducible carbon dioxid, as is practicable, supplying any deficiency in the sensible heat of the gas below the quantity of heat above specified, by burning a portion of the said furnace gas by air which has been preheated by heat taken from a portion of treated gas, in proximity to a bed of ignited carbonaceous fuel, and passing the gas mixture resulting from the partial combustion of said gas through said bed of ignited carbonaceous fuel, the said gas mixture being contacted first with that extremity of said fuel bed in which the fuel contains the greatest proportion of combustible and then with fuel containing a regressively lessening proportion of combustible as the temperature of the said gas is diminished by the heat absorbed in the reduction of its contained carbon dioxid to carbon monoxid.

9. The process of treating a combustible metallurgical-furnace gas, containing a reducible proportion of carbon dioxid, to change said carbon dioxid to carbon monoxid which consists in withdrawing the said furnace gas from the furnace at a temperature as near to the temperature at which the sensible heat of the gas will suffice to counterbalance the heat required for the reduction of its reducible carbon dioxid, as is practicable, supplying any deficiency in the sensible heat of the gas below the quantity of heat above specified, by burning a portion of the said furnace gas by air, which has been preheated by heat taken from a portion of treated gas, in proximity to a bed of carbonaceous fuel, passing the gas mixture resulting from the partial combustion of said gas through said bed of ignited carbonaceous fuel, the said gas mixture being contacted first with that extremity of said fuel bed in which the fuel contains the greatest proportion of combustible and then with fuel containing a regressively lessening proportion of combustible, as the temperature of the said gas is diminished by the heat absorbed in the reduction of its contained carbon dioxid to carbon monoxid, and passing the so-treated gas through a recuperator whereby a portion of the sensible heat of the treated gas is transferred to an air current.

10. The process of treating a combustible metallurgical-furnace gas, containing a reducible proportion of carbon dioxid, to change said carbon dioxid to carbon monoxid which consists in withdrawing the said furnace gas from the furnace at a temperature as near to the temperature at which the sensible heat of the gas will suffice to counterbalance the heat required for the reduction of its reducible carbon dioxid, as is practicable, supplying a portion of any deficiency in the sensible heat of the gas below the quantity of heat above specified, by burning a portion of said gas in a superheater to heat the remainder of said gas, supplying the balance of any such deficiency in the sensible heat of said gas by burning a portion of the remainder of said gas by admixing therewith in proximity to a mass of incandescent carbonaceous fuel by air which has been preheated by heat taken from the sensible heat of a portion of finished gas, and contacting the gas mixture resulting from the above mentioned partial combustion of the gas with said mass of incandescent carbonaceous fuel the said gas mixture being first contacted with that portion of said carbonaceous fuel having the highest proportion of combustible and then with fuel containing a regressively lessening proportion of combustible, as the temperature of said gas mixture is diminished by the heat absorbed in the reduction of its contained carbon dioxid.

11. The process of treating a combustible metallurgical-furnace gas containing a reducible proportion of carbon dioxid, to change said carbon dioxid to carbon monoxid which consists in withdrawing the said furnace gas from the furnace at a temperature as near to the temperature at which the sensible heat of the gas will suffice to counterbalance the heat required for the reduction of its reducible carbon dioxid as is practicable, supplying a portion of any deficiency in the sensible heat of the gas below the quantity of heat above specified, by burning a portion of said gas in a superheater to heat the remainder of said gas, supplying the balance of any such deficiency in the sensible heat of said gas by burning a portion of the remainder of said gas in proximity to a mass of incandescent carbonaceous fuel by admixing with said gas the proper proportion of preheated air, passing the resulting gaseous mixture in contact with said incandescent carbonaceous fuel, the said gaseous mixture being first contacted with that portion of said fuel containing the greatest proportion of combustible, and then with portions of said fuel containing a regressively lessening proportion of combustible, as the temperature of said gaseous mixture is diminished by the heat absorbed in the reduction of its carbon dioxid and passing the so-treated gas through a recuperator whereby a portion of its sensible heat is transferred to the air to be used in the heating of a fresh portion of furnace gas.

Signed at New York city in the county of New York and State of New York this 16th day of February A. D. 1910.

HENRY L. DOHERTY.

Witnesses:
W. G. BERRYMAN,
THOS. I. CARTER.

Copies of this patent may be obtained for five cents each, by addressing the "Commissioner of Patents, Washington, D. C."